United States Patent [19]

Miyake et al.

[11] 4,008,090

[45] Feb. 15, 1977

[54] PROCESS FOR THE PRODUCTION OF TUNGSTEN CARBIDE OR MIXED METAL CARBIDES

[75] Inventors: Masaya Miyake; Akio Hara; Noriyuki Ayano, all of Itami, Japan

[73] Assignee: Sumitomo Electric Industries, Ltd., Osaka, Japan

[22] Filed: Sept. 2, 1975

[21] Appl. No.: 609,729

Related U.S. Application Data

[63] Continuation-in-part of Ser. No. 287,024, Sept. 7, 1972, abandoned.

[30] Foreign Application Priority Data

Sept. 7, 1972  Japan .............................. 47-69937

[52] U.S. Cl. ................................. 106/43; 423/440
[51] Int. Cl.² .................. C04B 35/52; C01B 31/34
[58] Field of Search ...................... 106/43; 423/440

[56] References Cited

UNITED STATES PATENTS

| | | | |
|---|---|---|---|
| 979,303 | 12/1910 | Arsem | 423/440 |
| 2,289,104 | 7/1942 | Dawihl et al. | 106/43 |
| 2,356,009 | 8/1944 | Schwarzkopf | 106/43 |
| 3,403,008 | 9/1968 | Hamling | 423/440 |
| 3,716,627 | 2/1973 | Middelhoek | 423/440 |

OTHER PUBLICATIONS

Schwartzkopf, et al., *Refractory Hard Metals*, New York, 1953, pp. 101–103, 143–147, and 175–176.

*Primary Examiner*—Walter R. Satterfield
*Attorney, Agent, or Firm*—Wenderoth, Lind & Ponack

[57] ABSTRACT

A process for the production of tungsten carbide or mixed metal carbides, which comprises mixing tungsten oxide powder of mixed high melting point metal oxide powders with carbon powder in an amount sufficient to form the corresponding carbide, heating the mixture at a temperature of higher than 1000° C in an inert atmosphere or in vacuum to reduce the oxygen content and then heating at a temperature of higher than 1400° C in hydrogen atmosphere, thereby to form tungsten carbide or mixed metal carbides directly from the corresponding oxide.

4 Claims, 7 Drawing Figures

FIG. 1
CARBURIZATION TEMPERATURE AND CHANGE OF CARBON QUANTITY.

FIG. 2
REACTION MODEL IN CARBON BOAT

FIG. 5 REACTION PRODUCTS AT VARIOUS TEMPERATURES IN TiO₂-W-C SYSTEM

FIG. 7 REACTION PRODUCTS AT VARIOUS TEMPERATURES IN WO₃-C SYSTEM

FIG. 6
REACTION MODEL

(a) TiC-W-C SYSTEM (b) TiO2-W-C SYSTEM (c) TiO2-WO3-C SYSTEM

PROCESS FOR THE PRODUCTION OF TUNGSTEN CARBIDE OR MIXED METAL CARBIDES

This is a continuation-in-part of applicants' copending application Ser. No. 287,024, filed Sept. 7, 1972, now abandoned.

BRIEF SUMMARY OF THE INVENTION

This invention relates to a process for the production of tungsten carbide or mixed metal carbides and more particularly, it is concerned with a process for the production of powdered tungsten carbide (WC) or mixed metal carbides such as tungsten carbide-titanium carbide (WC-TiC), tungsten carbide-titanium carbide-tantalum carbide (WC-TiC-TaC) and tungsten carbide-titanium carbide-tantalum carbide-columbium carbide (WC-TiC-TaC-CbC) directly from the corresponding oxide or oxide mixtures.

Various attempts to produce the carbides of this kind have hitherto been made but are unsatisfactory on an industrial scale. The ordinary method of producing tungsten carbide consists in reducing tungsten oxide to form metallic tungsten and carburizing the resulting metallic tungsten. On the other hand, the method of producing tungsten carbide directly from tungsten oxide is advantageous because the processing can be shortened but the direct carburization of tungsten oxide has not been successful on an industrial scale but just on an experimental scale. The reason therefor lies in two points in that it is difficult to (1) control the content of carbon and (2) to control the grain size and grain size distribution of carbide.

The mixed metal carbides or solid solution carbides such as (WTi)C, (WTiTa)C and (WTiTaCb)C are prepared by the following several methods:

1. Metal oxides are mixed and carburized to form a mixed carbide.
2. A mixture of metal powders is carburized with a carbonaceous material to form a mixed carbide.
3. A mixture of carbides is heated.
4. A mixed carbide is prepared in a fused bath followed by separation thereof.
5. Additives to increase the diffusion speed, for example, 0.5% of cobalt or nickel is added and heated to obtain a high purity mixed carbide in a short time. Any of these methods is developed for the purpose of forming a uniform solid solution of mixed carbide, which contains less impurities and less soluble gases such as oxygen, nitrogen and hydrogen. The methods (2) and (3) have generally been practised on an industrial scale, but by use of these methods it is difficult to form a uniform complete solid solution and the grain size or grain size distribution is not uniform. The method (4), called the Menstrum method, comprises reacting carbides uniformly in a nickel or iron bath and then dissolving the metals with an acid, which method, however, has a disadvantage in that the iron and nickel cannot be completely removed and remain as impurities. The method (5) has also the similar disadvantage to the method (4). The method (1) has not been put to practical use because oxygen gas is not degassed completely, the quantity of carbon varies and abnormal crystals occur.

It is an object of the invention to provide a process for the direct carburizaton of tungsten oxide or mixed high melting point metal oxides, whereby the foregoing disadvantages of the prior art are overcome.

It is another object of the invention to provide a process for the production of powdered tungsten carbide or powdered mixed metal carbides by the two step carburization method, which can be industrialized.

It is a further object of the invention to provide a process for the production of tungsten carbide powder or mixed metal carbide powders having a very narrow grain size distribution.

It is a still further object of the invention to provide a process for the production of a high purity mixed carbide which solid solution is uniform and which is stable.

Still more objects will be apparent from the following detailed description.

BRIEF DESCRIPTION OF THE DRAWING

The accompanying drawings illustrate the principle and merits of the invention in more detail.

DETAILED DESCRIPTION OF THE INVENTION

We, the inventors, have found as a result of many studies that the foregoing objects can be accomplished by a process for the production of tungsten carbide or mixed metal carbides, which comprises mixing tungsten oxide powder or mixed high melting point metal oxide powders with carbon powder in an amount sufficient to form the corresponding carbide, heating the mixture at a temperature of higher than 1000° C in an inert atmosphere or in a vacuum to reduce the oxygen content and then heating at a temperature of higher than 1400° C in a hydrogen atmosphere, thereby to form tungsten carbide or mixed metal carbides directly from the corresponding oxide. In connection with this process, it is to be understood throughout the specification that the temperatures in the second stage heating i.e. under a hydrogen atmosphere are higher than that in the first stage. A typical temperature difference between these stages is about at least 200° C.

The tungsten oxide may be prepared in a conventional manner, for example, from tungstic acids and ammonium paratungstate, and, as occasion demands, may in situ be formed from such materials. In particular, using ammonium paratungstate, the tungsten oxide may be formed by heating with three or four equivalents of carbon powder at a temperature of from 600° to 800° C, directly followed by the above mentioned two heating steps.

We have made efforts to clarify the reason why it is difficult to control the quantity of carbon and have reached the following conclusion. The reaction form will now be illustrated, in particular, by which tungsten carbide is directly formed from tungsten oxide. In general, tungsten oxide is mixed with carbon powder and reacted in a hydrogen stream in a Tammann furnace.

This reaction formula is represented by:

$$WO_3 + 3C + H_2 \rightarrow WC + 2CO + H_2O \quad (1)$$

and, by our studies, considered to be divided as follows:

| | | |
|---|---|---|
| $WO_3 + H_2 \rightarrow WO_2 + H_2O$ | (~700° C) | (1)-2 |
| $WO_2 + 2H_2 \rightarrow W + 2H_2O$ | (700–1000° C) | (1)-b |
| $2H_2O + 2C \rightarrow 2CO + 2H_2$ | (1100° C~) | (1)-c |
| $W + C \rightarrow WC$ | (1000–1400° C) | (1)-d |

Figure 1:
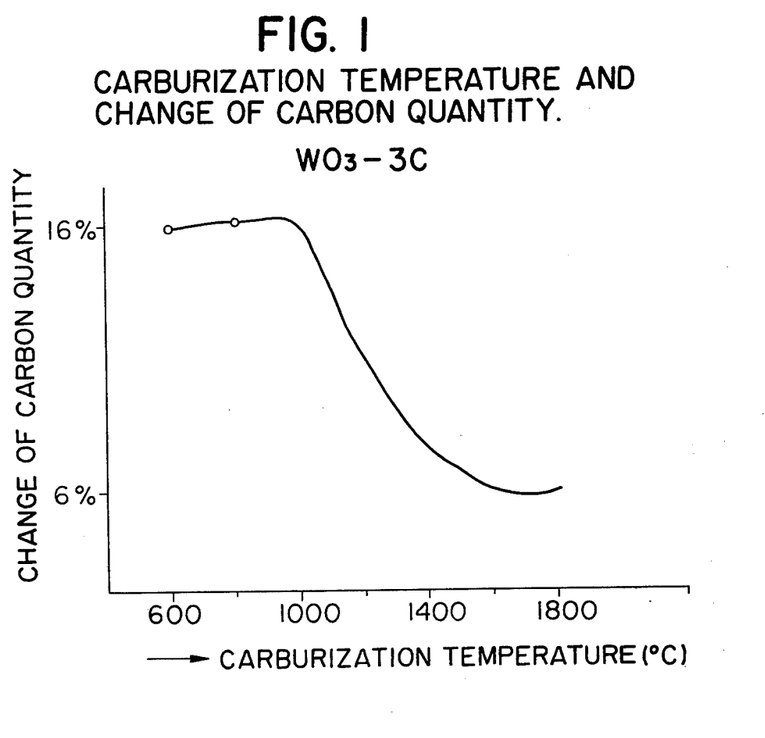
FIG. 1 is a graph showing the relation of the change of carbon quantity and carburization temperature when $WO_3 + 3C$ are reacted in hydrogen.
Figure 2:
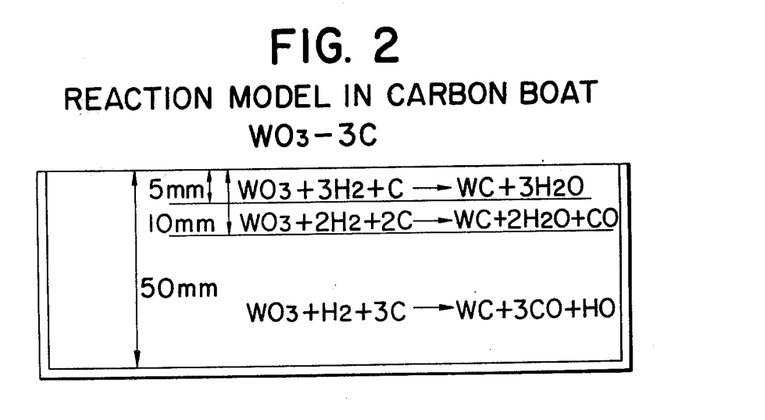
FIG. 2 is a reaction model of $WO_3 + C$ in a carbon boat.

The reaction (1)-c is the so-called water gas reaction depending largely on the temperature and the quantity of hydrogen, as well known. It is found that this reaction makes it difficult to control the quantity of carbon. FIG. 1 shows the change of carbon quantity when $WO_3 + 3C$ are reacted. This is an example where the thickness of a powder layer is 50 mm and the feed of hydrogen is less. As is evident from this graph, there is no change of carbon quantity up to 1000° C and a formation of tungsten is found by X-ray observation. When the temperature is raised, the reaction (1)-c takes place with an decrease of carbon value. Since the sectionally viewed reaction form is, as shown in FIG. 2, such that the surface layer is supplied with plenty of hydrogen and the thus formed water is dissipated enough, the reaction (1)-c scarcely take place. In such case, the reaction proceeds according to the following reaction formula (2):

$$WO_3 + 3H_2 + \quad C \rightarrow WC + 3H_2O \quad (2)$$

If a small quantity of powder is reacted sufficiently with hydrogen so that the reaction (1)-c may not occur, therefore, tungsten carbide which carbon quantity is stable is formed in principle. It is desirable in order to produce this commercially to hold the thickness of a powder layer and to flow plenty of hydrogen thus dissipating the generated gas well. On an industrial scale, however, it is necessary to advance the reaction to a great extent in a short time, and new problems occur in that the reaction (1)-c predominates and the generated water reacts with a heating element to markedly shorter the furnace life.

It is also known to react with carbon without the use of hydrogen gas in an inert gas or in vacuum. This method, however, encounters disadvantages because a temperature of higher than 1700° C is required for forming complete tungsten carbide and abnormal crystals are formed due to pores inside the grain although the quantity of combined carbon in the formed tungsten carbide is substantially theoretical.

Considering the foregoing reaction mechanism, we have noticed that if reduction of tungsten carbide is carried out with carbon only without using hydrogen, there is no generation of water and the troubles caused by water can be prevented. On the other hand, however, it is difficult to finally obtain normal tungsten carbide having the theoretical quantity of combined carbon unless hydrogen does participate in the carburization reaction. Now we have succeeded in obtaining normal tungsten carbide by carrying out the reduction step in an inert atmosphere and carburizing in a hydrogen stream. The reactions of the invention are represented by the following formulas:

| | |
|---|---|
| $WO_3 + 4C \rightarrow WC + 3CO$ | (3) |
| $WO_3 + 3C \rightarrow W + 3CO$ | (3)-a in $N_2$ |
| $W + C \rightarrow WC$ | (3)-b in $H_2$ |

The feature of the invention consists in carrying out the first step reduction of the formula (3)-a at a temperature of from 1000° to 1600° C in an inert gas and the second carburizing reaction at a temperature of from 1400° to 2000° C in hydrogen.

If the first carburization is carried out at a temperature of lower than 1000° C in an inert atmosphere, the reaction (3)-a does not proceed well and oxygen remains after the first carburization. This oxygen reacts with hydrogen in the second carburization to form water causing a change of carbon quantity. If the first carburization is carried out at a temperature of higher than 1600° C, there occurs the grain growth before complete tungsten carbide is formed, resulting in an abnormal crystal of tungsten carbide. If the second carburization is carried out at a temperature of lower than 1400° C, the combined carbon does not reach the stoichiometric value, while if higher than 2000° C, the formed WC is decomposed into $W_2C$. Any of these products cannot be put to practical use as a raw material of cemented carbides.

The present invention aims to produce tungsten carbide on a large scale and the two step carburization method is employed to improve the prior art method, which has not been put to practical use on a large scale, because the reaction mixture is directly reacted in hydrogen or in vacuum. In the practice of the process according to the invention, it is desirable to contact a powder to be reacted with a gas intimately so that the gas formed during reaction may well be dissipated and the carbon in the second carburization may be supplied from the gas in the form of methane. In order to obtain a complete tungsten carbide powder available for industrial use, the reaction is preferably carried out by the use of a reaction furnace wherein the reaction powder is adequately stirred during reaction or a rotary furnace wherein carburization of a reaction mixture is accomplished while being revolved. On the rotary furnace of this kind, we have filed another patent application entitled "ROTARY FURNACE FOR CARBURIZATION" (U.S. Ser. No. 187,953).

Figure 3:
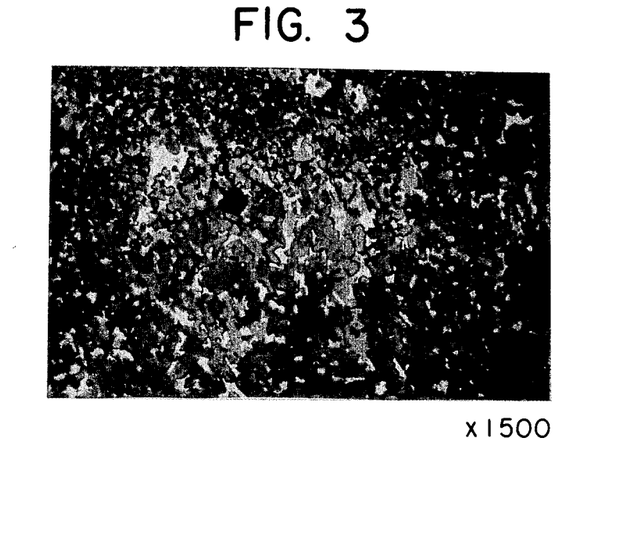
FIG. 3 is a photomicrograph showing a cemented carbide made of the tungsten carbide powder prepared by the process of the invention.
Figure 4:
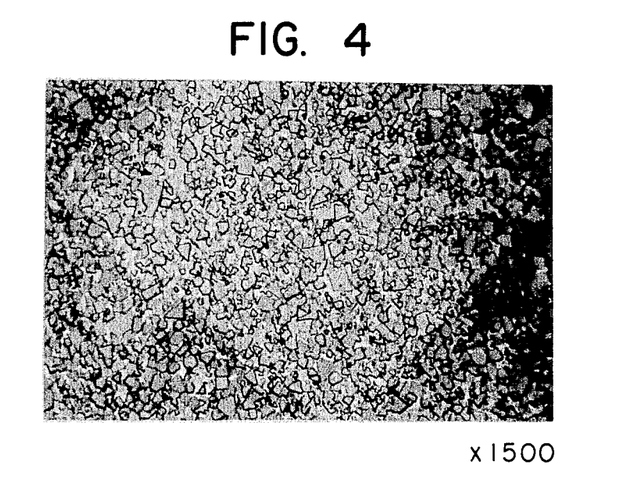
FIG. 4 is a photomicrograph showing a cemented carbide made of a tungsten carbide powder prepared by the prior art method.

FIG. 3 is a photomicrograph showing a cemented carbide made of a tungsten carbide powder obtained by the direct carburization of tungsten oxide at a temperature of 1800° C in hydrogen atmosphere. There are found a number of abnormally grown tungsten carbide grains in this photomicrograph. The cemented carbide cannot be put to industrial uses. FIG. 4 is a photomicrograph showing another cemented carbide made of a tungsten carbide powder produced from tungsten oxide according to the invention, which tungsten carbide powder has wholly a uniform grain size distribution and is substantially the same as produced from metallic tungsten in the known manner.

Figure 5:
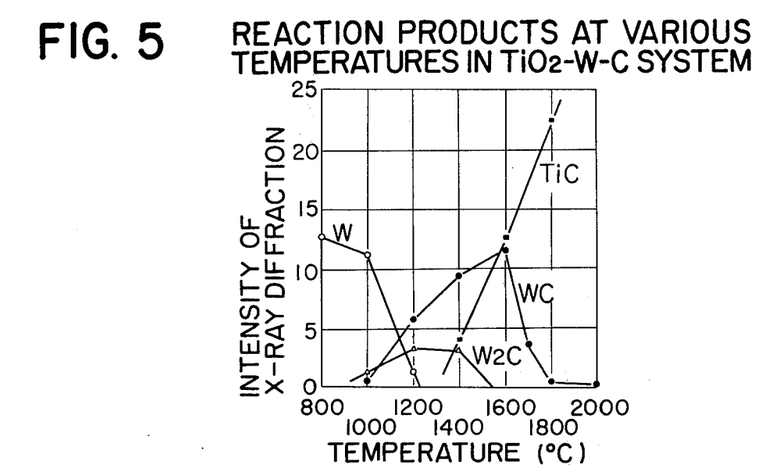
FIG. 5 is a graph showing the change of reaction products with temperatures when a mixture of $W-TiO_2-C$ is reacted.

With respect to the mixed metal carbides, formation of (W-Ti)C solid solution carbide will be illustrated in detail. Referring to FIG. 5, change of the reaction product at various temperatures is shown by change of the peak of X-ray diffraction line, from which it is apparent that W is substantially converted into WC at a temperature of lower than the temperature at which the solid solution reaction proceeds (1600° C), $TiO_2$ is converted into TiC as soon as WC is formed and the solid solution reaction proceeds, and that is, the reaction of from W to WC is independent on the solid solution forming reaction.

Figure 6:
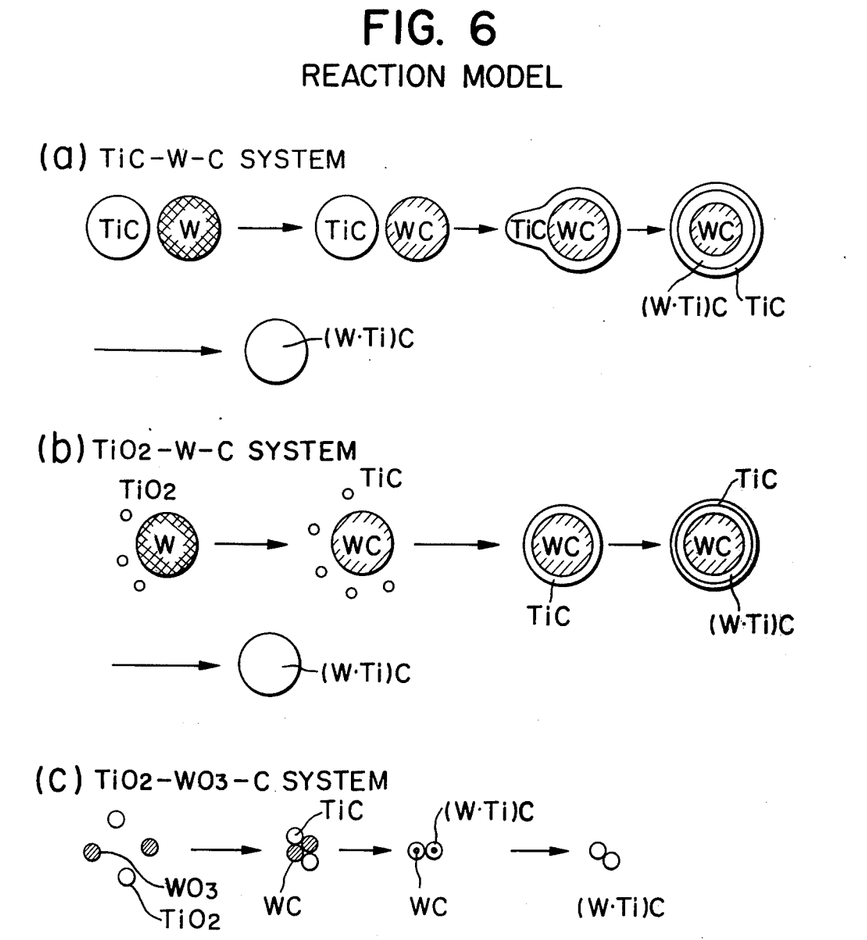
FIG. 6 is a reaction model showing the reaction states using various starting materials.

Now the reaction form or state will be taken into consideration. In the system TiC-W-C, as shown in FIG. 6, W is first converted into WC and then TiC diffuses round WC where a solid solution carbide of (W·Ti)C is formed at the boundary layer. In the system $TiO_2$-W-C also, it is thought that WC is first formed round which TiC is formed, thus forming (W·Ti)C and, that is to say, the uniformity of solid solution as well as the quantity of solid solution depend on the grain size of tungsten.

In order to effect the solid solution sufficiently, it is desirable that the grain size of the formed WC be smaller, because the diffusion distance of TiC is accordingly shorter. It is desired also that TiC grains are the finer. Considering foregoing observation results, it is desired in the reaction of of $WO_3$-$TiO_2$-C for the production of (W·Ti)C that fine grain WC is formed from $WO_3$ before the solid solution reaction.

Figure 7:
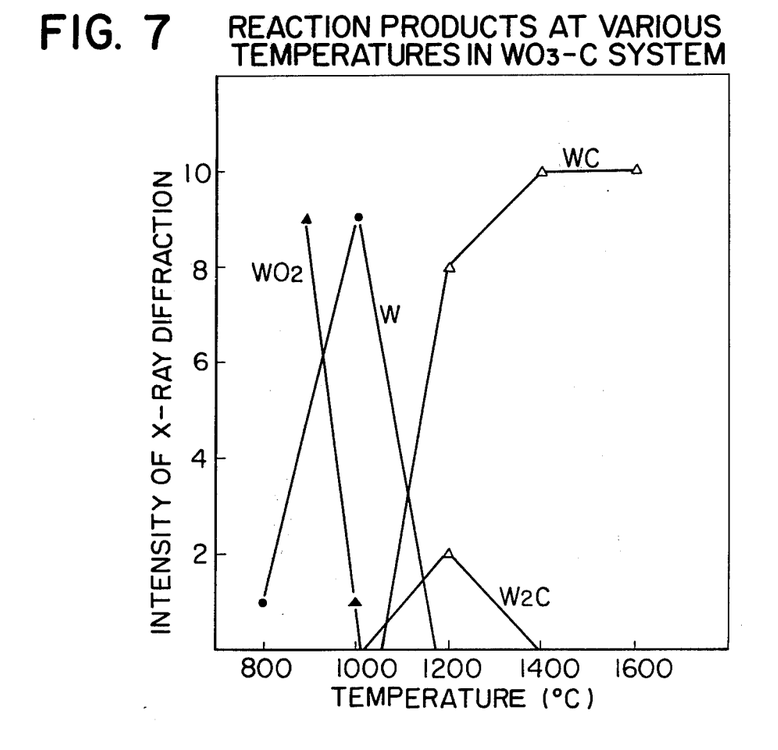
FIG. 7 is a graph showing the change of reaction products with temperatures when a mixture of $WO_3-C$ is reacted.

In FIG. 7 are shown reaction products when $WO_3$ is heated with carbon. This graph shows that $WO_3$ and $WO_2$ diminish at 1000° C and are substantially converted into WC at 1400° C. That is to say, $WO_3$ is substantially converted into WC before the solid solution reaction starts (1600° C) and, accordingly, the solid solution conditions are considerably satisfied. However, production of a mixed carbide (W·Ti)C from $WO_3$-$TiO_2$-C has not been industrialized because of the following reasons:

1. The solid solution is incomplete.
2. A number of abnormal crystal grains are formed.
3. Carbon control is impossible.

We have made efforts to overcome these reasons and found a way for industrialization. The most important point is to determine whether the reducing reaction is carried out with hydrogen or with carbon. To make a complete carbide, carburizing is preferably carried out in a carburizing atmosphere of hydrogen. When an oxide is reduced at a temperature of higher than 1000° C, the generated water reacts with carbon to consume it. This causes a change of carbon value and abnormal growth of grains due to the reaction with water. When reacted in nitrogen, nitrogen is dissolved in titanium carbide to form titanium nitride. If titanium nitride is formed, the solid solution is too brittle to be practically used as a raw material of cemented carbides. Moreover, the quantity of combined carbon does not reach the theoretical value. In order to allow the quantity of combined carbon to come near the theoretical value, it is necessary to mix the oxide and carbon powders very well, since there is no carburizing from the gaseous phase, but this mixing is very hard on a large scale.

Considering these facts, we have succeeded in developing a process for the production of a complete solid solution, (W·Ti)C. That is to say, the feature of the invention consists in carrying out the reaction of converting $WO_3$ into WC at a temperature of from 1000 to 1600° C in nitrogen atmosphere and carrying out the solid solution forming reaction of WC and TiC in hydrogen. WC is completely formed at a temperature ranging from 1000° to 1600° C in hydrogen as shown in FIG. 7. Even if the reaction is carried out at this temperature in nitrogen, WC is formed by the reaction of $WO_3 + 4C \rightarrow WC + 3CO$. The content of oxygen is reduced to less than 5%, so generation of water decreases and, consequently, fine grain WC is stably formed without change of carbon value and formation of abnormal crystals. Within this temperature range, TiC is formed with some TiN as shown but the reaction at higher than 1600° C in hydrogen advances the solid solution reaction of TiC and WC thus evolving nitrogen and oxygen. The change of carbon value is substantially converged to the theoretical value by carburization and decarburization in hydrogen atmosphere. If the reaction is carried out at lower than 1000° C in hydrogen, reduction of $WO_3$ is incomplete as shown in FIG. 7 and a large amount of oxygen remains with generation of water. If the reaction is carried out at higher than 1600° C in nitrogen, the solid solution of WC and TiC starts to proceed as shown in FIG. 5. Since the atmosphere is of nitrogen at this time, nitrogen is hard to dissipate and TiN is formed simultaneously with the solid solution with considerable possibility. When the temperature is raised to higher than 1600° C in nitrogen, progress of the solid solution reaction is late and, at the same time, WC and TiC grains grow so that the solid solution of the final carbide may be incomplete.

The two step carburization process for the production of mixed metal carbides according to the invention may preferably be carried out by the used of a reaction furnace or rotary furnace similar to the case of producing tungsten carbide according to the invention.

The quantity of gases (oxygen, hydrogen and nitrogen) contained in the carbide obtained by this process is satisfactory as a generally used carbide, but, where higher quality cemeted carbide are required, it is preferred to carry out a degassing treatment at a temperature of higher than 1600° C in vacuum. When this degassing treatment in vacuum is carried out after the two step carburization in nitrogen and hydrogen, a residual part where the carbuization is not fully completed is further reacted and the quantity of combined carbon is thus increased. Simultaneously the solid solution forming reaction proceeds further to evolve the oxygen, hydrogen and nitrogen contained therein. When the carbide subjected to this third vacuum treatment is used as a raw material for cemented carbides, therefore, a product markedly excellent in properties can be produced.

When the rotary furnace is used in the practice of the invention, carbon monoxide produced in the first carburization step in nitrogen can readily be withdrawn, the reaction being thus accelerated, and, in the second step in hydrogen, the carburization from methane contained in the hydrogen can sufficiently be effected. The third treatment in vacuum may be carried out by using the rotary furnace after modifying it somewhat.

Of course, the process of the invention is applicable to the production of other mixed metal carbides such as (Ti-Ta)C, (W-Ti-Ta)C, and (W-Ta-Cb)C with the similar advantages.

The following examples are given in order to illustrate the invention in detail without limiting the same.

EXAMPLE 1

Tungsten oxide ($WO_3$) powder of 0.2 $\mu$ was mixed with four equivalents of carbon black, pressed in a mold under a pressure of 1 ton/cm$^2$ and then crushed to give a powder having a grain size of 1 to 0.2 mm. The resulting powder was charged in a carbon case to give a thickness of 5 mm and subjected to carburization at 1200° C in a nitrogen stream using a horizontal type Tammann furnace After the first carburization, the powder was subjected to second carburization at 1600° C in a hydrogen stream to obtain tungsten carbide powder as shown in Table 1.

Table 1

|  | T.C | F.C | $O_2$ |
|---|---|---|---|
| First carburization at 1200° C in $N_2$ | 8.68 % | 5.31 % | 0.1 % |
| Second carburization at 1600° C in $H_2$ | 6.19 % | 0.06 % | 0.02 % |

The thus resulting tungsten carbide powder was a normal crystal having a grain size of 1 $\mu$.

When this powder was mixed with 10% of cobalt powder and sintered at 1400° C for 1 hours, a cemented tungsten carbide was obtained having the same properties as obtained by carburization of metallic tungsten powder.

Comparative Example 1

Tungsten oxide ($WO_3$) powder of 0.2 $\mu$ was mixed with three equivalents of carbon black, from which a powder was prepared in the similar manner to Example 1, and then charged in a carbon case to give thickness of 20 mm. The powder was subjected to carburization reaction in a hydrogen stream in a horizontal type Tammann furnace at 1400° C, 1600° C and 1800° C for 20 minutes to obtain tungsten carbide powder as shown in Table 2:

Table 2

| Carburization Temp. | T.C | F.C | C.C |
|---|---|---|---|
| 1400 ° C | 7.45 % | 1.52 % | 6.02 % |
| 1600 ° C | 6.98 % | 0.95 % | 6.09 % |
| 1800 ° C | 8.14 % | 2.21 % | 6.06 % |

The quantity of combined carbon was near the theoretical value, but the change of total carbon was large and there were a number of incomplete crystals of tungsten carbide.

A cemented carbide WC-10% C. prepared by the use of the thus resulting powder had a number of abnormally grown WC($\alpha_2$) and was not capable of being put to industrial use.

EXAMPLE 2

Tungsten oxide ($WO_3$) powder of 3 $\mu$ was mixed with four equivalents of carbon black and charged in a carbon boat to give a thickness of 20 mm. The carbon boat was charged in a horizontal type Tammann furnace and heated at 1400° C for 10 minutes in an argon gas stream. The resulting first carbide was a mixture is WC and $W_2C$ containing oxygen 0.02%, T.C 6.70% and F.C 1,50%.

The first carbide, being 10 mm in thickness, was further reacted at 1800° C minutes in a hydrogen gas stream to obtain tungsten carbide powder of 3 $\mu$ containing T.C 6.53% and F.C 0.40% and having the same grain size distribution as the tungsten carbide obtained by carburizing metallic tungsten.

The resulting WC powder was mixed with 10% of cobalt of 5 hours using acetone by means of a vibrating ball mill. After drying to remove the solvent, the mixture was pressed in a mold under a pressure of 1 ton/cm$^2$ and sintered at 1400° C for 10 minutes to obtain a product having the following properties:

Table 3

| Specific Gravity | Hardness (HRA) | TRS* |
|---|---|---|
| 14.56 | 89.6 | 240 |

*TRS=transverse rupture strength

As shown in the above table, the tungsten carbide powder had the same properties as that obtained by carburization of metallic tungsten powder and was capable of being put to industrial use.

EXAMPLE 3

Tungsten oxide ($WO_3$) powder of 1 $\mu$ was mixed with four equivalents of carbon black and processed similarly to Example 1. The thus grain controlled powder was charged in a graphite crucible having a diameter of 50 mm and a height of 50 mm and placed in a vertical type vacuum Tammann furnace. The furnace was evacuated to a vacuum degree of 2 × 10$^{-2}$ mmHg and the temperature was raised at a rate of 10° C/min. The mixture was further held at 1300° C for 1 hour.

The thus resulting first carbide was charged in a carbon case to give a thickness of 20 mm and heated at 1700° C for 10 minutes in a horizontal type hydrogen Tammann furnace, obtaining WC powder containing T.C 6.22% and F.C 0.10% and having a grain size of 1 $\mu$.

When the same mixed powder of tungsten oxide and carbon was directly reacted at 1700° C for 1 hour in the above mentioned vacuum furnace, the product contained T.C 6.39% and F.C 0.68% and the quantity of combined carbon did not reach the theoretical value.

EXAMPLE 4

Tungsten oxide ($WO_3$) powder of 0.2 $\mu$ was mixed with 3.5 equivalents of carbon black and processed similarly to Example 1. Using a rotary furnace for the purpose of effecting sufficiently the contact and dissipation of the reaction gases and produced gases, the mixture was moved in a revolving tube of graphite at a rate of 30 cm/min and heated at 1200° C in nitrogen. An X-ray analysis of the reaction product after the first carburization showed peaks of W, $W_2C$ and WC but no peaks of $WO_3$ and $WO_2$. The content of oxygen was 0.3%.

Then the first carbide was reacted at 1600° C in hydrogen using the above mentioned rotary furnace for carburization. The thickness of the powder layer in the rotary furnace was held about 20 mm and tungsten carbide (WC) was produced at a rate of 10 kg/hr, containing T.C 6.20% and F.C 0.10% and having a grain size of 0.6 $\mu$. The tungsten carbide was free from abnormal grains and suitable for use as a raw material of cemented carbides.

Comparative Example 2

A mixture of tungsten oxide powder and 1 equivalent of carbon black was prepared and processed similarly to Example 1. The thus grain size controlled powder was moved continuously in a thickness of 10 mm in a revolving tube of graphite of rotary furnace and heated at 1800° C in hydrogen. When 1 kg of tungsten carbide was produced, the graphite tube was attacked by the water produced by the reaction $WO_3 + C + 3H_2 \rightarrow WC + 3H_2O$ so that it might not be resistant to use. The resulting tungsten carbide contained T.C 6.12% and F.C 0.03% corresponding to the theoretical value but was not the normal WC powder.

EXAMPLE 5

Tungsten oxide ($WO_3$) powder of 0.3 $\mu$, titanium oxide ($TiO_2$) powder of 0.2 $\mu$ and carbon black were mixed to give a solid solution ratio of WC:TiC = 7:3 in a ball mill in such a manner that the mixture did not aggregate. The mixture was pressed in in a mold under a pressure of 1 ton/cm² and then crushed to give a powder having a grain size of less than 1 mm. The resulting powder was passed through a revolving tube of graphite of rotary furnace heated at 1400° C in nitrogen and the intermadiate product was further reacted at 1900° C in hydrogen, followed by a degassing treatment at 1800° C in vacuum, using the same rotary furnace. The resulting carbide had the properties as shown in Table 1:

Table 4

|  | T.C % | F.C % | C.C % | $O_2$ % | $H_2$ % | $N_2$ % |
|---|---|---|---|---|---|---|
| (W.Ti)C according to the invention | 9.68 | 0.02 | 9.66 | 0.094 | 0.0031 | 0.0041 |
| (W.Ti)C according to the prior art method | 9.72 | 0.13 | 9.59 | 0.072 | 0.0065 | 0.0117 |

An X-ray diffraction test showed no peak of WC in the solid solution carbide obtained by the process of the invention.

Using these solid solution carbides, cemented carbides were prepared as shown in Table 5:

Table 5

| WC of 1 $\mu$ | (W.Ti)C | Co |
|---|---|---|
| 51 % | 40 % | 9 % |

The solid solution carbide powders according to the invention and according to the prior art method were prepared by the above mentioned recipe, blended with acetone for 5 hours by means of a vibrating ball mill, dried to remove the solvent, pressed in a mold under a pressure of 1 ton/cm² and sintered at 1400° C for 30 minutes to obtain cemented carbides as shown in Table 6:

Table 6

|  | Specific Gravity | Hardness | TRS kg/mm² |
|---|---|---|---|
| According to the invention | 12.9 | 91.0 | 230 |
| According to the prior art | 12.9 | 90.9 | 160 |

It was observed regarding the structure that the (W.Ti)C phase of the invention is of uniform and round grains, wetted well with the Co phase in comparison of that of the prior art.

EXAMPLE 6

Tungsten oxide ($WO_3$) powder, titanium oxide ($TiO_2$) powder, tantalum oxide ($Ta_2O_5$) powder and carbon black were mixed to give a solid solution ratio of WC:TiC:TaC=5:3:2, blended and processed similarly to Example 5 to prepare a grain size controlled powder. The resulting powder was subjected to the first carburization at 1400° C in nitrogen by means of a rotary furnace and then to the second carburization at 2000° C in hydrogen to obtain a carbide as shown in Table 7:

Table 7

|  | T.C % | F.C % | C.C % | $O_2$ % | $H_2$ % | $N_2$ % |
|---|---|---|---|---|---|---|
| According to the invention | 9.97 | 0.15 | 9.82 | 0.05 | 0.0021 | 0.0011 |

An X-ray diffraction test showed that, in the solid solution carbide (W.Ti.Ta)C of the inventon, TaC and WC were completely dissolved in TiC, whilst the solid solution was incomplete and a peak of TaC was much found in the carbide of the prior art.

The thus obtained carbide was then subjected to a degassing treatment at 2000° C in a vacuum rotary furnace.

The operation conditions of the rotary furnace in the above mentioned three steps are tabulated below:

Table 8

|  | 1st Reaction | 2nd Reaction | 3rd Reaction |
|---|---|---|---|
| Atmosphere | $N_2$ | $H_2$ | vacuum $10^{-3}$ mmHg |
| Gas flow rate | 15 l/min | 15 l/min | — |
| Carburization temp. | 1400 ° C | 2000 ° C | 1800 ° C |
| Inner diameter of |  |  |  |

Table 8-continued

|  | 1st Reaction | 2nd Reaction | 3rd Reaction |
| --- | --- | --- | --- |
| rotary cylinder | 100 mmφ | 100 mmφ | 100 mmφ |
| Dimension of heating element | 35 mmφ × 1700 | 35 mmφ × 2000 | 35 mmφ × 2000 |
| Inclination of furnace | 4° | 6° | 6° |
| Reaction time | 10 minutes | 10 minutes | 15 minutes |

The resulting carbide was shown in Table 9:

Table 9

|  | T.C % | F.C % | C.C % | $O_2$ % | $H_2$ % | $N_2$ % |
| --- | --- | --- | --- | --- | --- | --- |
| After vacuum treatment | 9.96 | 0.03 | 9.93 | 0.05 | 0.0011 | 0.0003 |

Using the above mentioned carbide, a raw material was prepared according to the recipe as shown in Table 10, ballmilled with acetone for 100 hours, dried to remove the solvent, pressed in a mold under a pressure of 1 ton/cm² and sintered at 1400° C for 30 minutes, obtaining a product having the properties as shown in Table 11:

Table 10

| WC | (W.Ti.Ta)C | Co |
| --- | --- | --- |
| 62.5 % | 30 % | 7.5 % |

Table 11

|  | Specific gravity | Hardness | TRS |
| --- | --- | --- | --- |
| Using (W.Ti.Ta)C not vacuum treated | 12.35 | 92.3 | 150 |
| Using (W.Ti.Ta)C vacuum treated | 12.35 | 92.7 | 180 |

Cemented carbides produced from the solid solution carbide obtained by the three step carburization process were cheaper and between than those obtained by the prior art.

In a preferred aspect of the present invention, the mixed metal oxide(s) and carbon powders are first subjected to pelletization. The pelletized mixture is then preferably heated under movement of agitation in a rotary furnace at a temperature of from 1000 to 1600° C in a nitrogen or argon atmosphere to reduce the oxygen content to less than 0.5% and then heating the intermediate product under movement or agitation in a rotary furnace at a temperature of from 1400° to 2000° C in a hydrogen atmosphere, the temperature of the second heating being substantially higher than the first heating. A typical difference between the first and second heating temperatures is about at least 200° C. The important feature of the present invention is that the quantity of carbon in the carbide is made uniform or constant by controlling the reaction conditions as follows:

1. The atmosphere is changed from nitrogen or argon to hydrogen.
2. The reaction temperature is raised from a range of 1000° C to 1600° C to a range of 1400° C to 2000° C, with the temperatures in the second heating stage being substantially higher than temperatures in the first heating stage.
3. The mixture of metal oxide(s) and carbon powder is subjected to pelletization and the pelletized mixture is then heated under agitation in a rotary kiln to control the proportions of $CO/CO_2$. The advantages of the aforementioned conditions are demonstrated in the following comparative Examples.

Comparative Example A 84 parts by weight of $WO_3$ powder of 1μ was mixed with 16 parts by weight of carbon black and 1 part by weight of stearic acid as a mixing aid for 10 hours in a ball mill, followed by adding about 23 parts by weight of water for the purpose of wetting sufficiently. The resulting mixture was extruded through a hole of 1.5 mmφ in diamater by means of an extruder to obtain pelletized grain of 1.5 mmφ × 3 mm. The pelletized powder was passed through a hot air dried of belt conveyor type and dried at 120°–150° C for about 30 minutes. 500 g of the dried powder was charged in a boat of semi-circular form of 36 mmφ and 300 mm in length and heated in a $N_2$ stream at 1200° C for 20 minutes. After the reaction, product samples were taken from the boat at the upper portion of 5 mm in depth and at the central portion and subjected to analysis, thus obtaining the following results:

|  | TC (Total Carbon) (%) | $O_2$ (%) |
| --- | --- | --- |
| Upper Portion | 5.82 | 0.67 |
| Central Portion | 13.87 | 5.7 |

It is evident from these results that the progress of the reaction is slower with the increase of the quantity of charge, due to the gases (CO, $CO_2$) produced.

When the charge in the boat was varied, the total quantity of carbon was varied as tabulated below:

|  | TC (%) | FC (%) | CC (%) | $O_2$ (%) |
| --- | --- | --- | --- | --- |
| 50 g | 6.35 | 0.70 | 5.68 | 0.25 |
| 100 g | 6.42 | 0.93 | 5.54 | 0.22 |
| 150 g | 7.05 | 1.38 | 5.74 | 0.21 |

Note:
TC = Total Carbon
FC = Free Carbon
CC = Combined Carbon

This phenomenon is possibly due to that the gas diffusion and gas composition in the powder layer are varied with the increase of the powder charge and, consequently, the reaction rates of C + O → CO and C + $O_2$ → $CO_2$ and proportion of both the reactions differ.

Then the following experiments are carried out considering that it is necessary to heat uniformly the powder and to effect the diffusion of the gas sufficiently in order to produce the carbide in a stable manner on a commercial scale.

The above described mixture in the state of a powder or a pelletized powder was fed continuously to a rotary kiln (graphite tube having an inner diameter of 80 mm$\phi$ and 1500 mm in length) at 1400° C while flowing $N_2$ gas through the kiln at a rate of 1.2 m³/hr. The powder or pelletized powder was moved at a rate of 5 kg/hr from the one end to the other end of the tube, and thus reacted. Samples were taken every 15 minutes and subjected to carbon analysis, thus obtaining the following results:

| Charge | Carbon Content (%) of Carbide Samples Time (min) | | | | | | Fluctuation |
|---|---|---|---|---|---|---|---|
| | 15 | 30 | 45 | 60 | 75 | 90 | |
| Pelletized Powder | 6.13 | 6.20 | 6.17 | 6.25 | 6.22 | 6.19 | 0.12 % |
| Powder | 5.87 | 6.18 | 6.03 | 6.53 | 5.32 | 6.00 | 1.21 % |

In the case of the pelletized powder, the fluctuation of the carbon content is within only about 0.12%, while in the case of the powder, it amounts to 1.21%. This is due to that the powder lumps or adheres to the inner wall of the rotary tube and some of the powder resides in the rotary kiln for a long time in the latter case. These results teach that a smooth flowing and stirring of the powder is necessary for the reaction of $WO_3$ and C.

Comparative Example B 84 parts by weight of $WO_3$ powder of 0.5 $\mu$ and 16 parts by weight of carbon black were taken by weighing, mixed with 1 part by weight of stearic acid as a lubricant and ball milled for 10 hours, followed by adding about 23 parts by weight of water thereto and mixing in a kneader for the purpose of wetting sufficiently. The resulting mixture was extruded through a hole of 1.5 mm$\phi$ in diameter by the use of an extruder to obtain pelletized grains of 1.5 mm$\phi$ × 3 mm. The pelletized powder was then passed through a hot air drier of a belt conveyor type and dried at 120°–150° C for about 30 minutes to reduce the water content in the pelletized powder to 0.5% or less. This pellitized powder was reacted continuously in a rotary kiln comprising a graphite rotary tube of 100 mm$\phi$ in inner diameter and 1500 mm in length and a graphite heating element arranged inside the graphite tube (Cf. U.S. Pat. No. 3,802,847). The rotary tube was revolved at 6 rpm and the pellitized powder was charged to give a thickness of about 13 mm. $N_2$ gas stream was flowed at a rate of 1.2 m³/hr and the central portion of the kiln was held at a temperature of 1600° C. The powder charged was heated from 800° C to obtain the predetermined temperature for about 5 minutes from the end of the rotary tube to the central portion, and held at the reaction temperature for about 5 minutes. The $N_2$ gas was flowed in countercurrent to the powder, so as to prevent the water contained in the pelletized powder and CO and $CO_2$ gases produced during the reaction from flowing toward the central portion of the kiln and to discharge them together with the $N_2$ gas. The ratio of the gases evolved and $N_2$ gas was about 1:2. The resulting carbide had a carbon composition of TC 6.18%, FC 0.21%, CC 5.97%, i.e. no theoretical value as WC.

Then the following carburization reactions were carried out in the above mentioned carburization rotary kiln for comparison;
Carburization at 1400° C in $N_2$
Carburization at 1400° C in $N_2$ and at 1700° C in $N_2$
Carburization at 1400° C in $N_2$ and at 1700° C in $H_2$
Thus the following results were obtained:

| | TC (%) | FC (%) | CC (%) |
|---|---|---|---|
| Carburization at 1400 ° C in $N_2$ | 6.25 | 0.52 | 5.73 |
| Carburization at 1400 ° C in $N_2$ and at 1700 ° C in $N_2$ | 6.20 | 0.24 | 5.96 |
| Carburization at 1400 ° C in $N_2$ and at 1700 ° C in $H_2$ | 6.35 | 0.21 | 6.13 |

No complete WC could be obtained by heating firstly the pelletized powder at 1400° C in $N_2$ by removing the reaction gas and then heating at 1700° C in $N_2$, but on the other hand, complete WC could be obtained when the second heating was carried out in $H_2$.

Such difference is possibly due to that the unreacted $W_2C$ and remaining carbon black are not sufficiently brought into contact and complete WC is hardly obtained even if the heating in $N_2$ is repeated many times, while, in the case of carrying out the second heating in a $H_2$ atmosphere, the remaining carbon black is firstly reacted with $H_2$ to form $CH_4$ and the $W_2C$ is reacted with $CH_4$ to give complete WC. In the case also, it is of course desirable that the grains and $CH_4$ generated are contacted sufficiently.

Comparative Example C 86 parts by weight of $WO_3$ powder and 14 parts by weight of carbon black (about 3 equivalents to $WO_3$) were mixed and extruded to prepare pelletized grains in an analogous manner to Comparative Example B. The pelletized powder was reacted at a $H_2$ flow rate of 1.2 m³/hr using the above described rotary carburization kiln. The dew point of $H_2$ used was −30° C. The powder was heated to the reaction temperature, i.e. 1600° C for 5 minutes and held at the same temperature of 5 minutes.

The pelletized powder was constantly fed to the end of the rotary graphite tube to give a thickness of 10 mm, and stirred and moved toward the central portion with the revolution of the rotary tube. The reaction proceeded as follows:

$WO_3 + H_2 \rightarrow WO_2 + H_2O$ $WO_2 + 2H_2 \rightarrow W + 2H_2O$ $W + C \rightarrow WC$ A large amount of water was generated, the quantity of $H_2O$ in $H_2$ reaching about 35%. About ⅔ of the $H_2O$ was reacted with carbon black and the residual $H_2O$ was reacted with the graphite heating element. The heating element was damaged and, after several hours, use of the kiln became impossible. Furthermore, it was reacted with the WC formed, resulting in a marked variation of the carbon quantity. The resulting carbide had a carbon composition of TC 7.32% and FC 1.18% in which the quantity of free carbon was great.

It can be seen from the above Comparative Examples that the various parameters of the present invention are critical.

Comparative Example A shows that the use of a pelletized mixed powder in a rotary furnace results in a reduction of the fluctuation of the carbon content in the product.

Comparative Example B shows that the change of atmosphere from nitrogen to hydrogen is essential.

Comparative Example C shows that when hydrogen is used as the sole reaction atmosphere throughout the reaction, a large amount of water is generated, resulting in the damaging of the heating element as well as the increase of the carbon content in the product.

What is claimed is:

1. A process for the production of tungsten carbide, which consists essentially of mixing tungsten oxide powder with three to four equivalents of carbon powder, subjecting the resulting mixture to pelletization, heating the pelletized mixture under movement in a rotary furnace at a temperature of from 1000° to 1600° C in a nitrogen or argon atmosphere to reduce the oxygen content of the oxide to less than 0.5% and then heating the intermediate product under movement in a rotary furnace at a temperature of from 1400° C to 2000° C in a hydrogen atmosphere, the temperature of the second heating being about 200° C higher than that of the first heating.

2. The process of claim 1 wherein the tungsten oxide is formed in situ by first mixing the carbon with tungsten compounds which oxidize during the reaction.

3. The process of claim 2 wherein at least one compound selected from the group consisting of tungstic acid and ammonium paratungstate is used.

4. A process for the production of tungsten carbide containing-mixed metal carbides selected from the group consisting of titanium carbide, tantalum carbide, columbium carbide and mixtures thereof, which consists essentially of mixing tungsten oxide powder-containing high melting point metal oxide powders selected from the group consisting of titanium oxides, tantalum oxides, columbium oxides and mixtures thereof, with carbon power in an amount sufficient to give the theoretical quantity of combined carbon, subjecting the resulting mixture to pelletization, heating the pelletized mixture under movement in a rotary furnace at a temperature of from 1000° to 1600° C in nitrogen to reduce the oxygen content of the oxide to less than 5% and then heating the intermediate product under movement in a rotary furnace at a temperature of from 1600° to 2000° C in a hydrogen atmosphere, the temperature of the second heating being about 200° C higher than that of the first heating.

* * * * *